Feb. 10, 1931. C. E. NORTH 1,791,511
MILK PASTEURIZING APPARATUS
Filed April 3, 1929  4 Sheets-Sheet 2
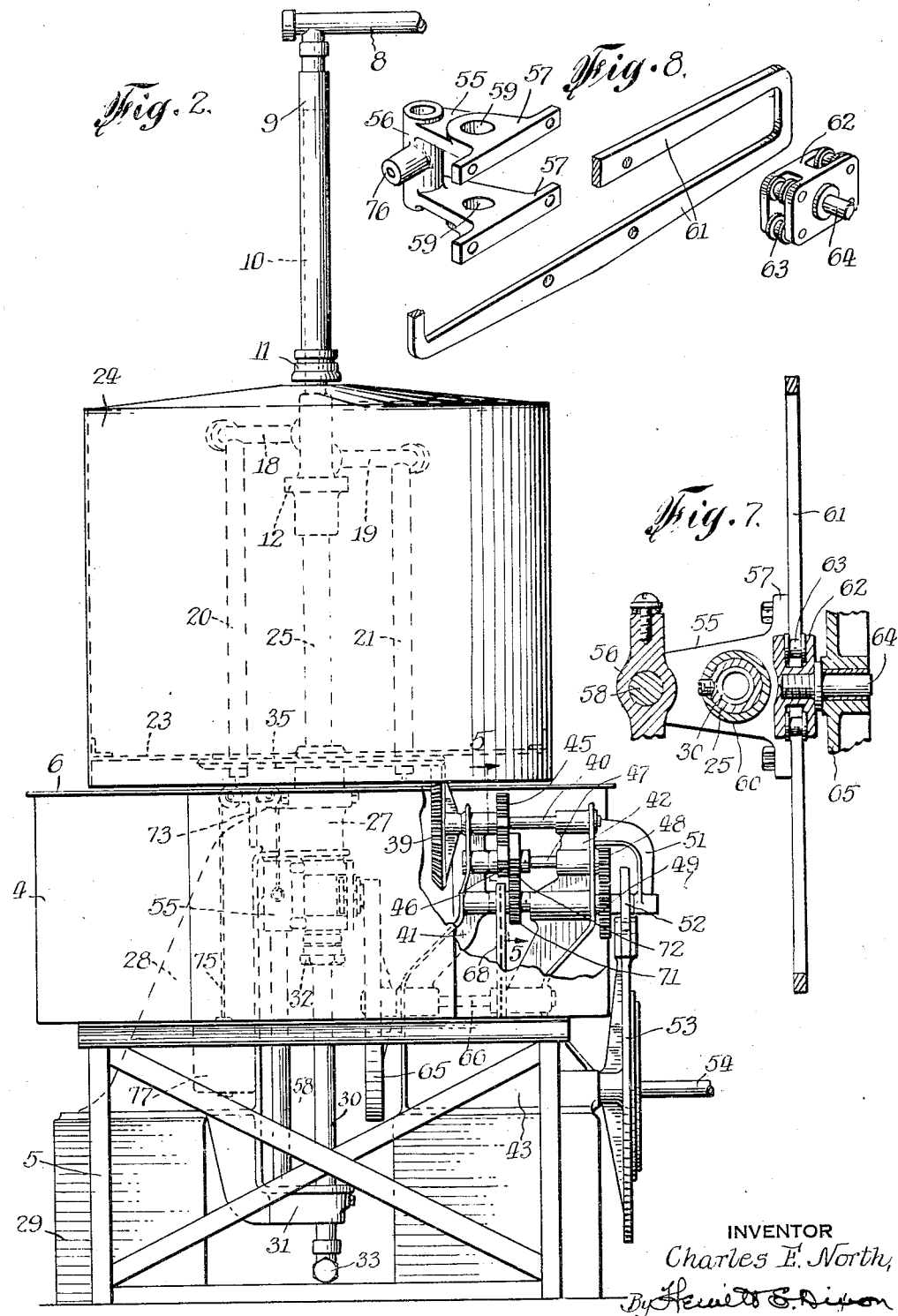
INVENTOR
Charles E. North,
By Hewitt E. Dixon
ATTORNEY

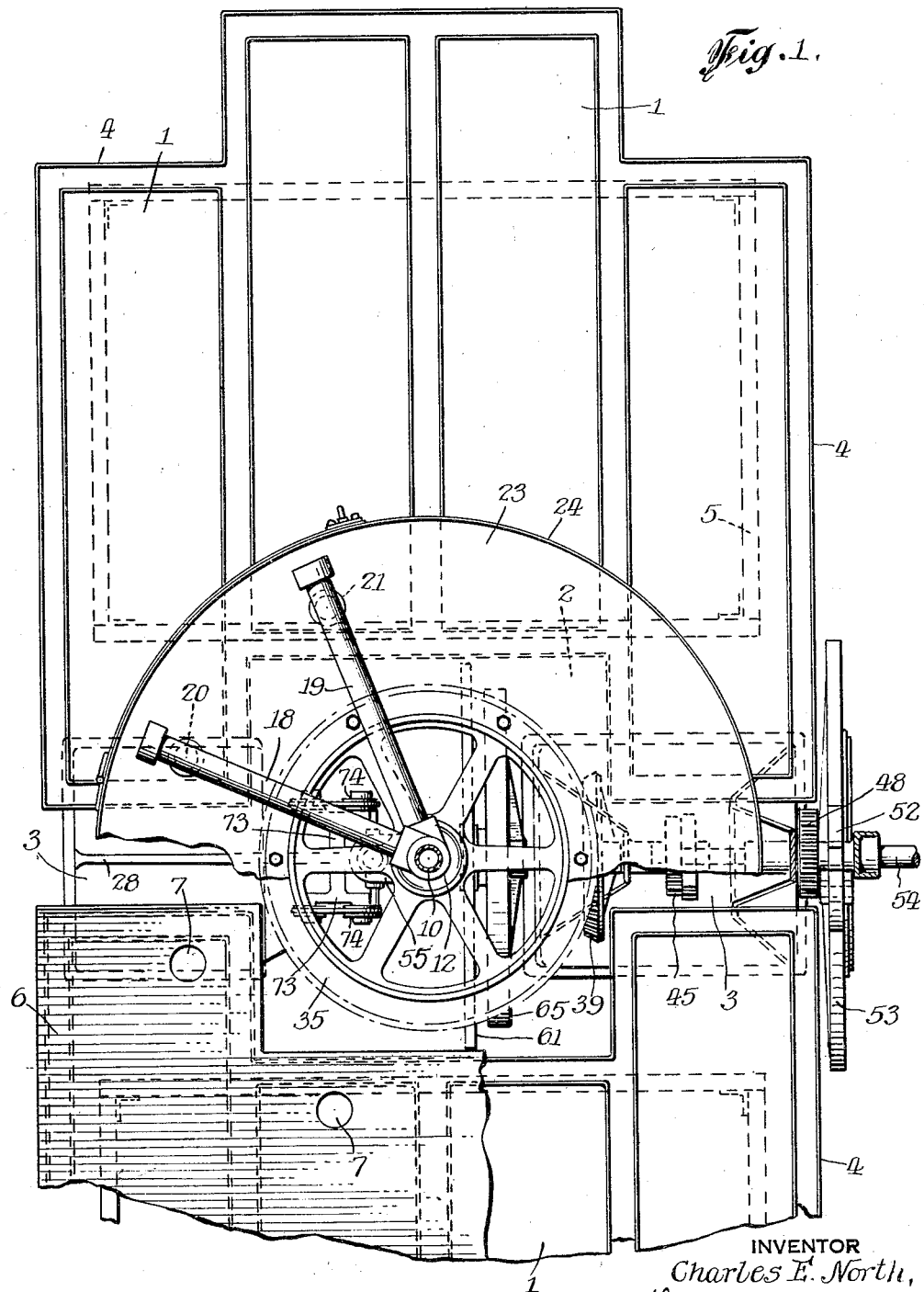

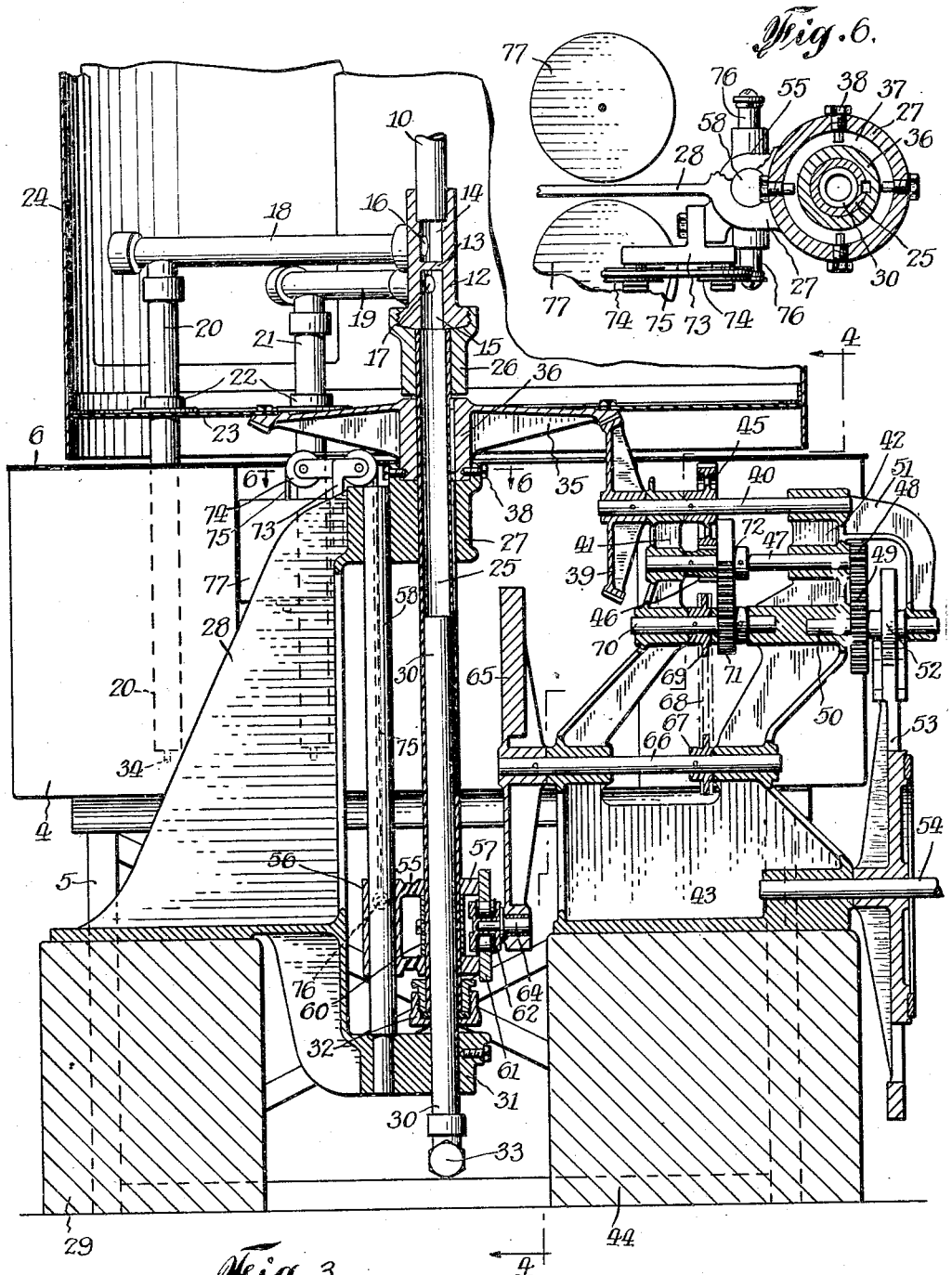

Feb. 10, 1931. C. E. NORTH 1,791,511
MILK PASTEURIZING APPARATUS
Filed April 3, 1929 4 Sheets-Sheet 4
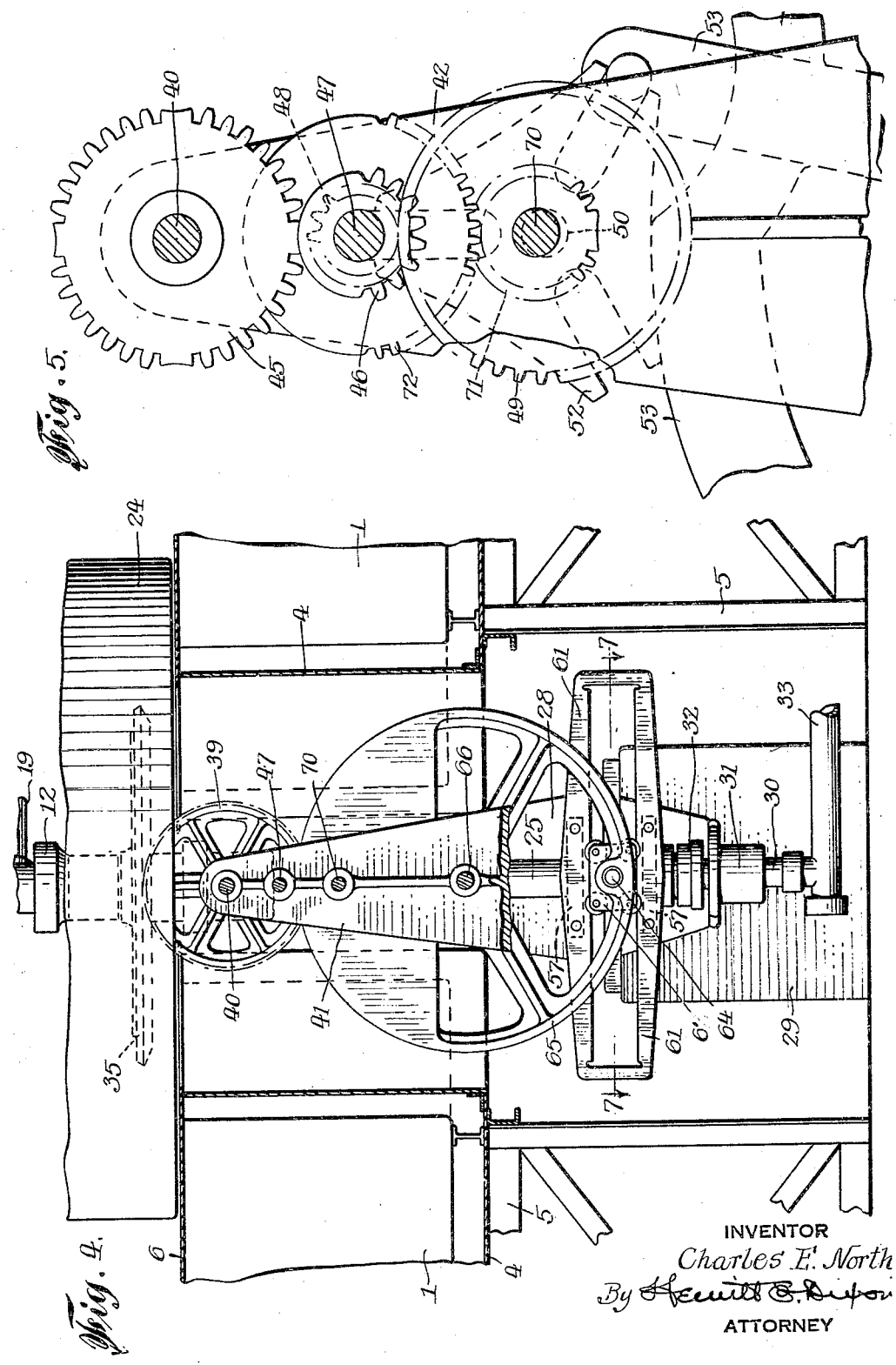
INVENTOR
Charles E. North
By Hewitt C. Dixon
ATTORNEY Patented Feb. 10, 1931

1,791,511

UNITED STATES PATENT OFFICE

CHARLES E. NORTH, OF MONTCLAIR, NEW JERSEY, ASSIGNOR TO THE CREAMERY PACKAGE MFG. COMPANY, OF CHICAGO, ILLINOIS, A CORPORATION OF ILLINOIS

MILK-PASTEURIZING APPARATUS

Application filed April 3, 1929. Serial No. 352,081.

My invention relates to improvements in apparatus for the pasteurization of milk and has particular reference to improvements in so-called "holders" for the storage or keeping of milk for a period of time and at a temperature required to effect the pasteurization treatment. My invention comprises improvements in the class of pasteurizing apparatus set forth in my applications Serial No. 151,362, filed November 29th, 1926, now Patent No. 1,742,871, Jan. 7, 1930, and Serial No. 287,715, filed June 23rd, 1928.

One of the objects of my invention is to provide improved means to cause supply and discharge pipes for the milk periodically to enter and recede from separate holding containers in timed sequence.

Another object is to provide simple and improved means for effecting rotative and reciprocatory operation of the milk supply and discharge pipes, with respect to the several containers.

A further object is to provide an especially compact arrangement of the containers whereby large holding capacity is obtained with a minimum of space occupied by the apparatus.

In carrying out my invention I provide a plurality of containers or tanks in which the milk is to be held, the containers being disposed in two groups with those of each group in longitudinally parallel relation, and with the adjacent ends of both groups of containers arranged so that a circular path described over them may be divided into as many equal segments as there are containers, with each division registering with one container. For filling and emptying the containers, I provide rotatively and reciprocatively supported supply and discharge pipes adapted to enter and recede from the containers at timed intervals, the pipes being rotatively supported in such a way as to be stepped or moved annularly with respect to successive containers, and reciprocatively supported in such manner as to be lowered successively into the several containers after each annular movement, for the filling and emptying operations, and thereafter lifted out of the containers, means to conduct milk to the supply pipe, and means to conduct milk from the discharge pipe.

My invention also comprises novel details of improvement and combinations of parts that will be more fully hereinafter set forth, and then pointed out in the claims.

Reference is to be had to the accompanying drawings forming a part hereof, wherein Fig. 1 is a plan view of a pasteurizing apparatus embodying the invention with portions of the tank structure and dome removed.

Fig. 2 is an end view in elevation, with a portion of the tank structure removed.

Fig. 3 is a sectional elevation taken on a vertical transverse plane through the axis of the supply and discharge tubes supporting and operating mechanism.

Fig. 4 is a sectional view in elevation of the operating mechanism as seen on the planes of the irregular line 4—4 in Fig. 3.

Fig. 5 is a sectional view in elevation of a portion of the driving mechanism as seen on the planes of the irregular line 5—5 in Fig. 2.

Fig. 6 is a fractional sectional plan view of a portion of the central tube supporting structure as seen on the plane of the line 6—6 in Fig. 3.

Fig. 7 is a fractional sectional plan view of a portion of the tube actuating mechanism as seen on the plane of the line 7—7 in Fig. 4.

Fig. 8 is a perspective view in detail of parts of the tube elevating mechanism.

Similar numerals of reference indicate corresponding parts in the several views.

The milk holder illustrated includes two groups of milk containers, tanks or compartments. Each group may comprise any number of compartments, but I have found that four compartments in each group are especially convenient in physical arrangement and in time periods required for filling, holding, and emptying the milk treated therein. As seen in Fig. 1, each group comprises four substantially rectangular compartments or tanks 1, of like holding capacity, and arranged in parallel with the two outer compartments extending endwardly beyond the two inner compartments at one end of the group. The two groups are positioned with their extended ends spaced from each other, and forming between them a large rectangular central space 2 with communicating lateral spaces 3.

The tanks 1 of each group preferably are spaced from each other and the entire group surrounded by an outer shell or jacket 4 spaced from the tank walls, the intervening spacing being adapted for the circulation of a heating medium, in manner well known to the art. This arrangement in two groups of parallel elongated tanks accomplishes very efficient utilization of floor space required for the complete apparatus, the central spaces 2 and 3 accommodating the operating mechanism.

The tanks and their outer jackets are supported upon suitable standards 5. A cover 6 is provided for each group of tanks, the covers having an opening 7 over each tank or compartment for the introduction of the filling and emptying tubes, the openings being equidistant and arranged in a circle including both groups.

An inlet pipe for the milk is indicated at 8, (Fig. 2) through which the heated milk may be supplied by gravity from an overhead tank, or in any other desired way. The pipe 8 communicates with a stationary outer pipe 9 of a pair of vertically positioned telescoping pipes, of which an inner pipe 10 is supported for rotative and reciprocatory movement within the outer pipe 9. The lower end of the outer pipe 9 is provided with a conventional packing gland 11 for sealing the junction of the two pipes against leakage of milk.

The lower end portion of the sliding pipe 10 is secured in a tubular bracket 12, the inner bore of which is divided by a partition or wall 13 (Fig. 3) into two axial chambers 14 and 15 without inter-communication. Each of the chambers has a lateral opening, indicated at 16 and 17, communicating respectively with a pair of radially extending tubular arms or pipes 18 and 19 secured to the bracket 12 in suitable nipples or flanges formed on the bracket. The pipes 18 and 19 are in angular relation, their outer end portions being spaced by the distance between the openings 7 in the tank covers, and respectively supporting in communication therewith a depending supply pipe 20 and a depending discharge pipe 21.

The supply and discharge pipes 20 and 21 are vertically slidable through suitable bearing rings 22 mounted in the bottom wall 23 of a rotatable dome structure 24 enclosing the operative milk conduits above described and having its axis coincident with that of the pipe 10 and bracket 12. By rotation of the dome and conduit structure, the supply and discharge tubes 20 and 21 may be registered with any pair of the openings 7 and the tubes lowered therethrough to fill one and empty another of the tanks 1, as hereinafter described.

Secured co-axially to the lower end portion of the bracket 12, and in communication with the chamber 15, is a vertical milk outlet pipe and supporting tube 25, its upper end carrying a union collar 26 threaded upon the end of the bracket. The tube 25 is partly supported for rotative and reciprocatory movement within a bearing provided in the upper arm 27 of a stationary bracket or standard 28 fixed upon a base 29. The tube 25 is further supported in telescopic relation with an inner stationary pipe or tube 30 rigidly secured in a lower arm 31 of the standard 28, the tube 25 having at its lower end a conventional packing gland 32 to maintain a liquid seal with the tube 30. The tube 30 is in communication with a milk outlet pipe 33 leading to a pump (not shown) for withdrawing the milk by suction from the tanks 1 through the discharge tube 21. Milk flow from the supply and discharge tubes 20 and 21, when the tubes are lifted for transfer from one pair of tanks to another, is prevented by means of valves located in the ends of the tubes, preferably poppet valves of which the stems, indicated at 34, extend downwardly for valve opening contact with the bottom walls of the tanks when the tubes are in lowered position. Also, I may use the pump control described in my co-pending application Serial No. 287,715 for stopping the suction pump on the discharge conduit during the interval of transfer of the supply and discharge tubes.

The rotative movement of the structure comprising the milk supply and discharge conduits is accomplished by means of a bevel gear 35 secured to the bottom wall 23 of the rotatable dome and mounted in co-axial relation to the tube 25, the latter having a longitudinally slidable bearing in the hub 36 of the gear but keyed thereto for rotation with the gear and dome. The gear hub 36 supports the weight of the dome and conduit structure, its lower face having operative bearing upon the recessed upper face of the stationary standard arm 27. A circumferential groove 37 (see Fig. 6) is formed about the lower end of the hub 36 into which extend a series of pins 38 mounted in a marginal flange formed on the bearing arm 27, by which means the gear and dome structure are retained against axial movement during the reciprocatory movement of the conduit structure.

The gear 35 is driven by a bevel pinion 39 rigidly mounted on a shaft 40 having spaced bearings in a pair of bearing arms 41 and 42 extending upward from a stationary standard 43 fixed upon a base support 44. The shaft 40 carries a rigidly mounted spur gear 45 driven by a pinion 46 mounted on a shaft 47 leaving bearings in the arms 41 and 42. The shaft 47 endwardly carries a gear 48 in driven engagement with a gear 49 mounted on a shaft 50 having bearings in the arm 42 and a bracket extension 51 thereof. Mounted on the shaft 50 in rigid relation to the gear 49 is a star wheel member 52 of a conventional Geneva stop mechanism, the star wheel having operative engagement with a driving member 53 mounted on a drive shaft 54 to which power is applied by any suitable means (not shown).

The reciprocatory movement of the milk conduit structure is accomplished by means of a vertically slidable bracket 55 (Figs. 7 and 8) comprising a sleeve base 56 and a pair of laterally extending spaced arms 57. The sleeve portion 56 has sliding bearing upon the stationary vertical guide rod 58 rigidly secured at its ends in the standard arms 27 and 31, the guide rod being parallel to the axis of the tubes 25 and 30. The bracket arms 57 are provided with openings 59 within which the tube 25 has free rotative bearing. A collar 60 rigidly mounted on the tube 25 between the arms 57 of the bracket secures the bracket and tube against relative longitudinal movement while permitting free rotative movement of the tube.

Rigidly secured to the ends of the arms 57 is a "scottish" yoke 61 within which is operatively mounted a cross head 62, preferably having anti-friction rollers 63 in bearing contact with the yoke. A crank pin 64, secured to the cross head, extends into a bearing provided therefor in the rim of a driving wheel 65 rigidly mounted on a shaft 66 having bearings in the arms 41 and 42. The shaft 66 carries a tight sprocket 67 driven by a chain belt 68 running over a driving sprocket 69 rigidly mounted on a shaft 70 having its bearings in the arms 41 and 42. The shaft 70 also carries a rigidly mounted gear 71 in driven engagement with a gear 72 secured on the shaft 47.

It will here be obvious that the driving gear trains above described, actuated by the Geneva stop mechanism, are operable intermittently to impart both rotative and reciprocatory movement to tube 25 and the other milk supply and discharge conduits supported thereby. However, these movements are in the cycle of, first, lifting the milk tubes out and clear of the holding tank structure, second, rotating the tubes one step in the circle of tank openings 7, third, lowering the milk tubes into the holding tanks. This cycle of movements is accomplished by constructing the driving gears 46 and 72, and the driven gears 45 and 71, for intermittent power transmission to the respective shafts 40 and 70 in the sequence required to produce the described cycle. Fig. 5 shows an arrangement of teeth and rest segments in the respective gears effective to accomplish the desired cycle in the apparatus herein illustrated, the illustrated position of the several gears being that from which the cycle is started with the lifting of the milk tubes by actuation of the star wheel in the Geneva mechanism. The milk tubes remain in the holding tanks, for the respective filling and emptying operations, during one revolution of the Geneva driving member.

For ease of operation, it is advantageous to counter weight the milk conduit structure. To that end, a pair of brackets 73 are mounted on the upper portion of the standard 28, each bracket carrying a pair of sheaves 74 over which run a pair of cables 75 respectively attached at one end to one of a pair of bosses 76 formed on the bracket 55, and at the other end supporting one of a pair of weights 77.

In accordance with my improvements, pasteurization of milk may be carried out in a continuous manner, and without danger of contamination of the pasteurized milk by contact or inter-mixture therewith or any unpasteurized or untreated milk, because there are no openings in the walls of the holding tanks, no inter-connected inlet piping nor discharge piping to or from the several tanks, and the supply and discharge pipes 20 and 21 never come in contact with the same milk except only after the expiration of the full holding period. Assuming that all of the eight containers or holding tanks are empty, and it is desired to hold the previously heated milk at a temperature of say 142° F. for a period of say thirty minutes, the shaft 54 will be started in operation, and at the appropriate time the pipes 20 and 21 will be lowered into adjoining containers 1, whereupon the milk will flow from the supply line 8 through pipe 20 into the container in which that pipe is positioned. The rotation of the filling and emptying pipe structure is intermittent or step by step, and timed so that the pipes 20 and 21 will remain in the containers for intervals of five minutes, less approximately fifteen seconds during which the pipes 20 and 21 will be raised from the containers, rotated respectively from one container to the next adjacent container and lowered into the latter.

After the milk in the first charged container has been held thirty minutes, all of the containers having been successively charged, the discharge pipe 21 will be entered into the said container and a pump connected to the discharge line 23 will cause the pasteurized milk from such container to be discharged, and so on thereafter each time pipe 21 is entered into a container in which the milk has been held for thirty minutes. During the time that a container is being discharged the next adjacent container is being charged with heated milk. In other words, after the containers have all been filled, each time that the pipes 20 and 21 are lowered into adjacent containers, one of the latter will be discharged of pasteurized milk through pipe 21 and the previously discharged container will be charged with heated milk, the charging and discharging of respective containers occurring substantially simultaneously, whereby the holding of the milk for the desired period of thirty minutes at the desired temperature may be effected and the operation may be carried on continuously from container to container.

I claim as my invention:

1. A milk pasteurizing apparatus comprising a pair of milk holding units, each unit including a plurality of relatively elongated containers arranged in substantially parallel relation with the ends of the outer containers disposed inwardly toward the other unit to form a central space between said units, a pair of milk tubes operatively supported for rotation over the adjacent ends of said containers, means for lowering and raising said tubes into and out of successive pairs of said containers for the filling and emptying thereof, and means within said central space for actuating said tube lowering and raising means.

2. A milk pasteurizing apparatus comprising a pair of unitary groups of containers, said groups being positioned in endwardly adjacent relation and said containers being arranged in each group so that the respective adjacent end portions of all of the containers of both groups are disposed substantially equidistant from a common center, a pair of milk tubes rotatable about said common center and supported for vertical movement into and out of successive pairs of containers for filling and emptying said containers.

3. A milk pasteurizing apparatus comprising a plurality of containers arranged in two adjacent unitary series disposed in such inter-relation as to form a major central space between said unitary series and a lateral space communicating with said central space, the adjacent end portions of said containers being substantially equidistant from the center of said major space, a pair of milk tubes rotatable over the adjacent ends of said containers, said tubes being supported for reciprocatory movement into and out of said containers, means mainly in said central space for imparting rotary and reciprocatory movement to said tubes, and means mainly within said lateral space for actuating said last mentioned means.

4. A milk pasteurizing apparatus comprising a plurality of covered containers having individual openings to the interiors thereof arranged equidistantly in a circle, a dome mounted over said openings and rotatable concentrically therewith, said dome having a floor with openings registerable with said container openings, a pair of milk tubes housed in said dome and operable through said openings when in register to charge and discharge milk in said containers successively, and means for operating said dome and tubes including milk inlet and outlet conduits.

5. A milk pasteurizing apparatus comprising a plurality of containers, said containers having openings into their interiors arranged annularly and equidistantly, a dome over said containers having openings in the bottom thereof registerable with the openings in said containers, said dome being rotatable on an axis common with said container openings, a milk charging tube, a milk discharging tube, said tubes being normally housed in said dome and having bearings respectively in the openings in the bottom of said dome for movement therethrough and through the openings in said containers for charging and discharging said containers, a reciprocatory support for said tubes, said support having a milk supply passage and a milk discharge passage, means for rotating said dome to successively register the openings in said dome with the openings in said containers, and means operable to raise and lower said support and cause said tubes to enter into and withdraw from said containers.

6. A milk pasteurizing apparatus as set forth in claim 5, provided with driving means for actuating said dome rotating means and said support reciprocating means, said driving means being operable to cause intermittently the sequential movements of raising said support to lift said tubes out of said containers, rotating said dome to carry said tubes to the next successive container openings respectively, and lowering said support to enter said tubes into said containers.

7. In a milk pasteurizing apparatus, the combination of a rotatable dome having a pair of openings in the bottom thereof, a pair of milk tubes in said dome positioned for reciprocatory movement through said openings, a reciprocatory support for said tubes, means for rotating said dome, means for reciprocating said support, and intermittent gear connections between said dome rotating means and said support reciprocating means whereby said means respectively are caused to operate intermittently to effect in sequence the lifting of said support, the rotating of said dome, and the lowering of said support.

In witness whereof I have hereunto attached my signature.

CHARLES E. NORTH.